United States Patent [19]

Chien

[11] Patent Number: 5,688,038

[45] Date of Patent: Nov. 18, 1997

[54] PROTECTIVE DEVICE WITH E.L. LIGHT MEANS

[76] Inventor: Tseng Lu Chien, 8F, No. 29, Alley 73, Lin-Shen Street, Shi-Chi Town, Taipei, Hseng, Taiwan

[21] Appl. No.: 421,647

[22] Filed: Apr. 13, 1995

[51] Int. Cl.⁶ .................................................. F21L 15/08
[52] U.S. Cl. .......................... 362/103; 362/84; 362/234; 362/806; 362/812
[58] Field of Search .......................... 362/84, 103, 234, 362/253, 806, 812; 2/22, 24, 911, 905, 906

[56] References Cited

U.S. PATENT DOCUMENTS

| | | | |
|---|---|---|---|
| 3,153,745 | 10/1964 | Gurian et al. | 315/206 |
| 5,077,837 | 1/1992 | Meistrell | 2/24 X |
| 5,151,678 | 9/1992 | Veltri et al. | 340/321 |
| 5,245,516 | 9/1993 | de Haas et al. | 362/108 |
| 5,245,517 | 9/1993 | Fenton | 362/156 |
| 5,249,106 | 9/1993 | Barnes et al. | 362/108 |
| 5,327,587 | 7/1994 | Hurwitz | 2/422 |
| 5,469,342 | 11/1995 | Chien | 362/103 X |
| 5,491,840 | 2/1996 | Yen | 2/24 X |
| 5,515,247 | 5/1996 | Cheung et al. | 363/103 X |

FOREIGN PATENT DOCUMENTS

| | | |
|---|---|---|
| 0 166 534 | 1/1986 | European Pat. Off. . |
| 2 221 025 | 1/1990 | United Kingdom . |

*Primary Examiner*—Stephen F. Husar
*Attorney, Agent, or Firm*—Bacon & Thomas

[57] ABSTRACT

A protective device made up of a padding material is arranged to include an EL strip and power pack to provide illumination for the device in addition to cushioning of impacts. The device can be worn as a calf, knee, or elbow pad, in which case a textile backpad and partially transparent or cutout relatively rigid front plastic cover are used, or the device can be wrapped around the metal parts of a bicycle or other vehicle, in which case the plastic cover is replaced by a partially transparent or cutout soft cover sheet. The inclusion of an EL light offers an eye-catching warning to motorists of children playing in the dark by the side of the road.

5 Claims, 7 Drawing Sheets

PROTECTIVE DEVICE WITH E.L. LIGHT MEANS

BACKGROUND OF THE INVENTION

1. Field of the Invention

This invention relates to a protective device having a textile front decoration sheet and padding made of a polyurethane foam, silicon gel, air cone, or the like for protecting the wearer from bodily injury in the event of a relatively minor fall or impact such as might occur during sports activities such as football, skating, skateboarding, and cycling, and an illumination arrangement to help the wearer avoid more serious impacts, particularly with a motor vehicle. The invention is, for example, suitable for protecting children playing in a dark environment on or by a roadside.

2. Discussion of Related Art

Protective devices which include padding made up of a soft material such as polyurethane (PU) foam, silicon gel, air-filled panels, or the like are known. Such devices are widely used to protect football players, skaters, and cyclists from bodily injury by absorbing the force of impacts. A textile-sheet is normally stitched or otherwise attached to and supported by the soft material which constitutes the padding, and straps or fasteners are added to form, for example, calf, ankle, knee, and elbow protectors. an extra front plastic cover may be included to protect the soft material from damage due to an impact, and also to distribute an impact more uniformly over the soft material. The front plastic cover, when applied to a knee pad or elbow pad, also offers protection from scrapes and scratches.

Protection devices of the above the can also be applied to toys and exercise equipment to protect the user from bodily injury. For example, a child's bicycle might have a protection device applied to the handlebar, central bike frame, and joint nut or stem between the handlebar and the main frame. Such protection devices are usually applied without the front plastic cover sheet so that the soft material is exposed, although a cover sheet would provide some protection for the soft cushioning material.

Both types of protective pad have in common the soft cushioning material, a fastening band usually made of VELCRO™, and a textile or plastic cover sheet. The protective pad may be used, in addition to the purposes mentioned above, for protecting persons who have been medically treated for bone pathologies or who have skin injuries.

While protective pads of the type described above are useful to protect the wearer from impacts caused by falls and collisions with other persons, however, they are useless in the event of a collision with a motor vehicle. This is an especially serious hazard in the case of physical activities occur in a nighttime environment. For example, camping, nighttime skating, and bicycling are all exciting but dangerous nighttime activities. It is usual in these activities to wear ankle, knee, and/or elbow protectors, but only for protection when striking a non-moving object. Such pads cannot provide sufficient protection from being struck by a motor vehicle.

One way of reducing the risk of being struck by a motor vehicle is increase the visibility of the wearer. It is known, for example, to include reflectors on vehicles such as bicycles that attain speeds of as much as 30 miles per hour. The problem with such reflectors is that they are poorly visible unless the headlight of a motor vehicle and the reflector is aligned at a sufficiently close distance before the reflector becomes fully visible to the motorist, by which time is often too late to stop. In addition, the user of the vehicle may not be visible once he or she leaves the vehicle, for example by falling off, and many high speed vehicles, such as skate boards or roller skates, are not equipped with any sort of reflector.

As an alternative to reflectors, it is known to provide active lighting in the form of incandescent bulbs or light emitting diodes, at least on some vehicles and on clothing. Such conventional lighting devices have the disadvantages of requirements of fragility, bulkiness, complicated wiring systems, difficulties in attachment to a the soft material, an inability to bend with the material, high power consumption, and narrow viewing angle.

SUMMARY OF THE INVENTION

In contrast to the above-mentioned types of protective pads which are unlighted, and the above-mentioned vehicle lighting arrangements having the above-mentioned disadvantages, the present invention provides an improved protective pad device which also includes a lighting arrangement made of a soft material that bends with the soft material of the padding, and has none of the disadvantages of fragility, bulkiness, complicated wiring systems, difficulties in attachment to the soft material, high power consumption, and narrow viewing angle possessed by conventional arrangements.

In addition, the present invention provides an improved power pack arrangement in which the power pack is enclosed within the soft material of the padding or within a strap or band so that the wearer is not exposed to the hard surface of the component housing, thereby avoiding inconvenience and potential harm to the wearer.

When the protective device of the invention is in the form of a calf, ankle, knee, or elbow protector, a front plastic cover is included. The front plastic cover can be made of a wholly or partly transparent material to allow light to pass through from an electro-luminescent (EL) light strip which has been glued, tape, stitched, or otherwise attached at an appropriate location within the cover. Advantageously, the EL light strip can have drawings, figures, characters, and other designs or words for the purpose of enhancing the attractive of the device or for promoting safety. The EL strip can be located in front of the soft material or in back of the soft material according to the design, while the lead wires for the EL strip may be well concealed under the pad attachment band. The outside of the Velcro™ fastening band may include an elastic type pocket for holding the power pack housing, including a DC power battery and an electric circuit made up of a switch, a DC-AC converter for supplying an activation signal of an appropriate frequency to the opposite poles of a chemical layer in the EL strip, conventionally a phosphor, the poles being isolated to thereby create a voltage potential and a resulting electric field across the phosphor, the phosphor being arranged to emit light when the voltage is varied at a characteristic excitation frequency.

DETAILED DESCRIPTION OF THE PREFERRED EMBODIMENTS

Figures 1, 2:
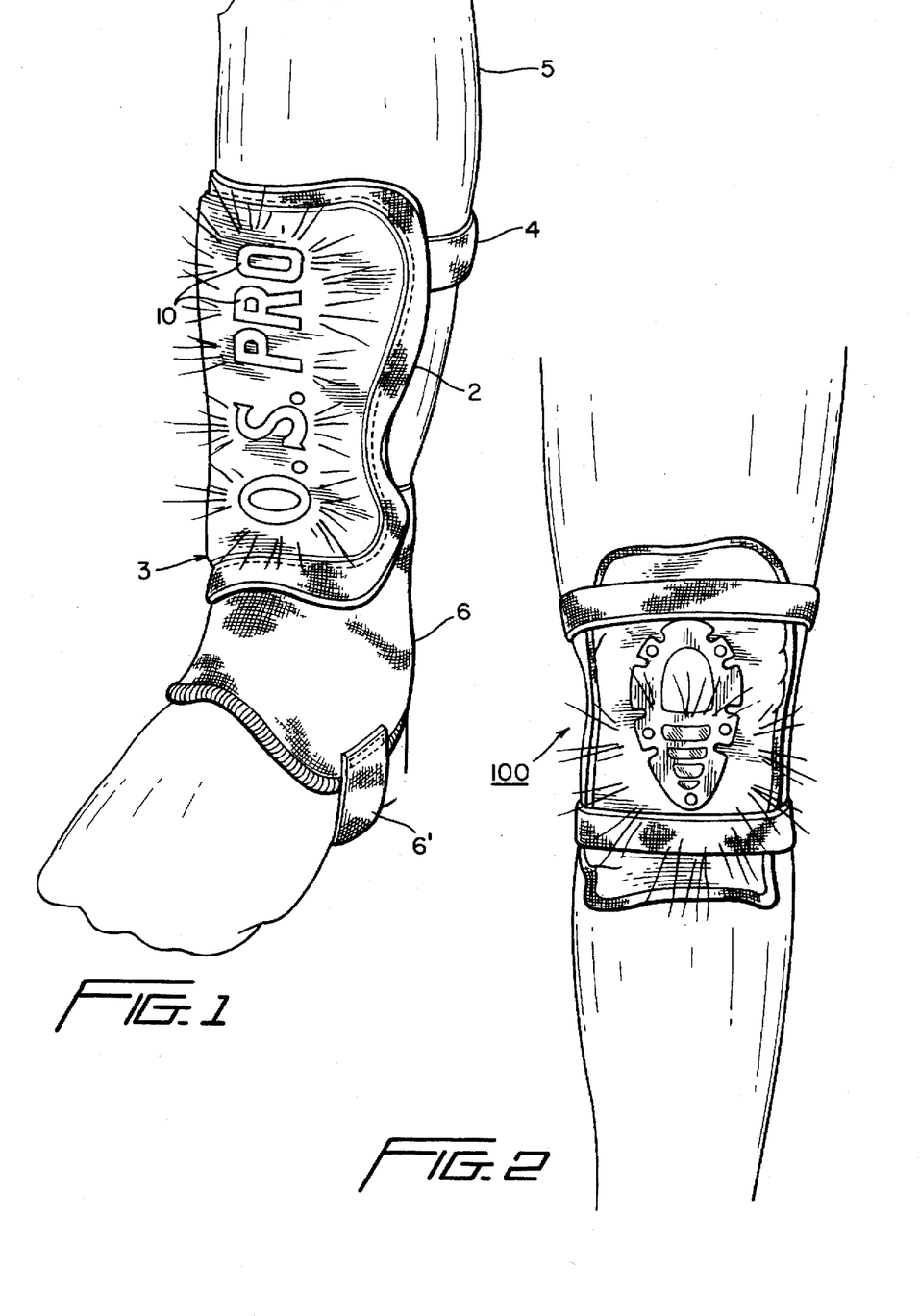
FIG. 1 is a perspective view of a calf protector constructed in accordance with the principles of a first preferred embodiment of the invention.
FIG. 2 is a front view of a knee protector constructed in accordance with the principles of the first preferred embodiment of the invention.
Figure 4:
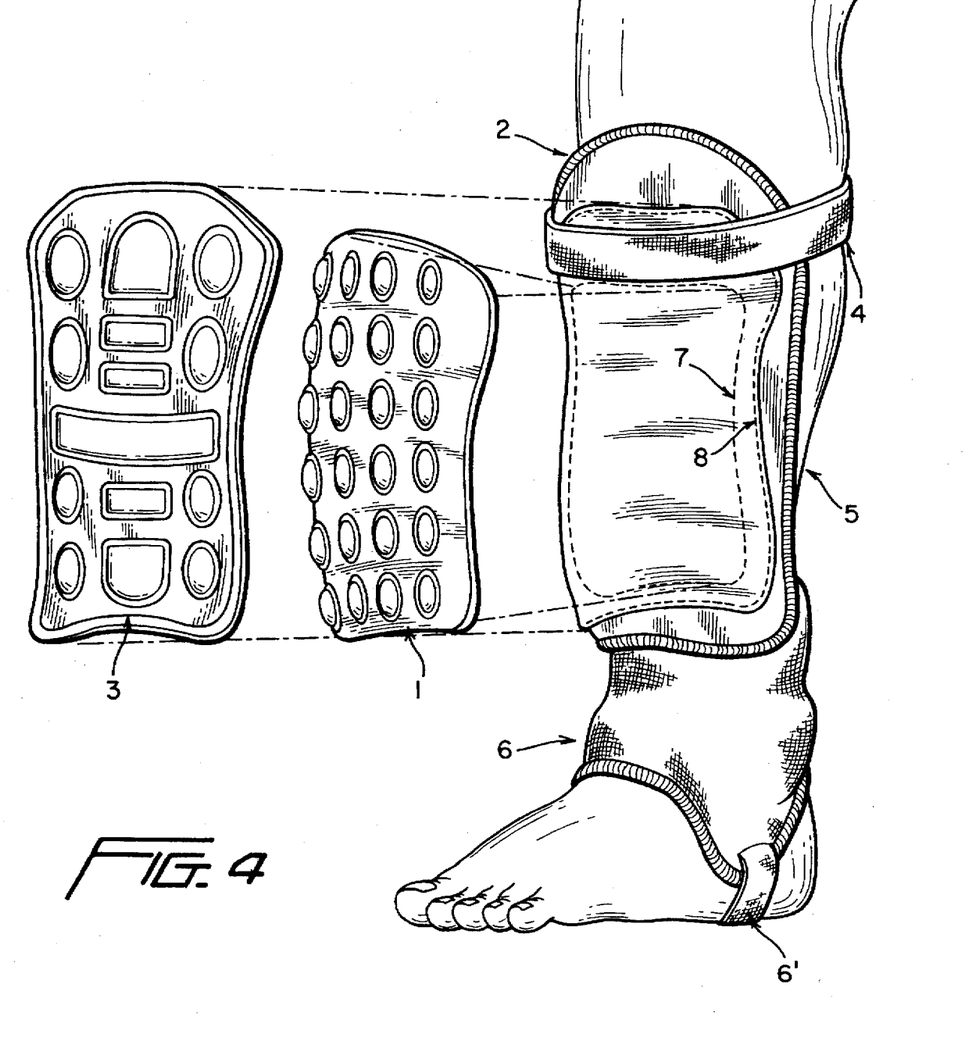
FIG. 4 is an exploded perspective view of the calf protector of FIG. 1.
Figure 5:
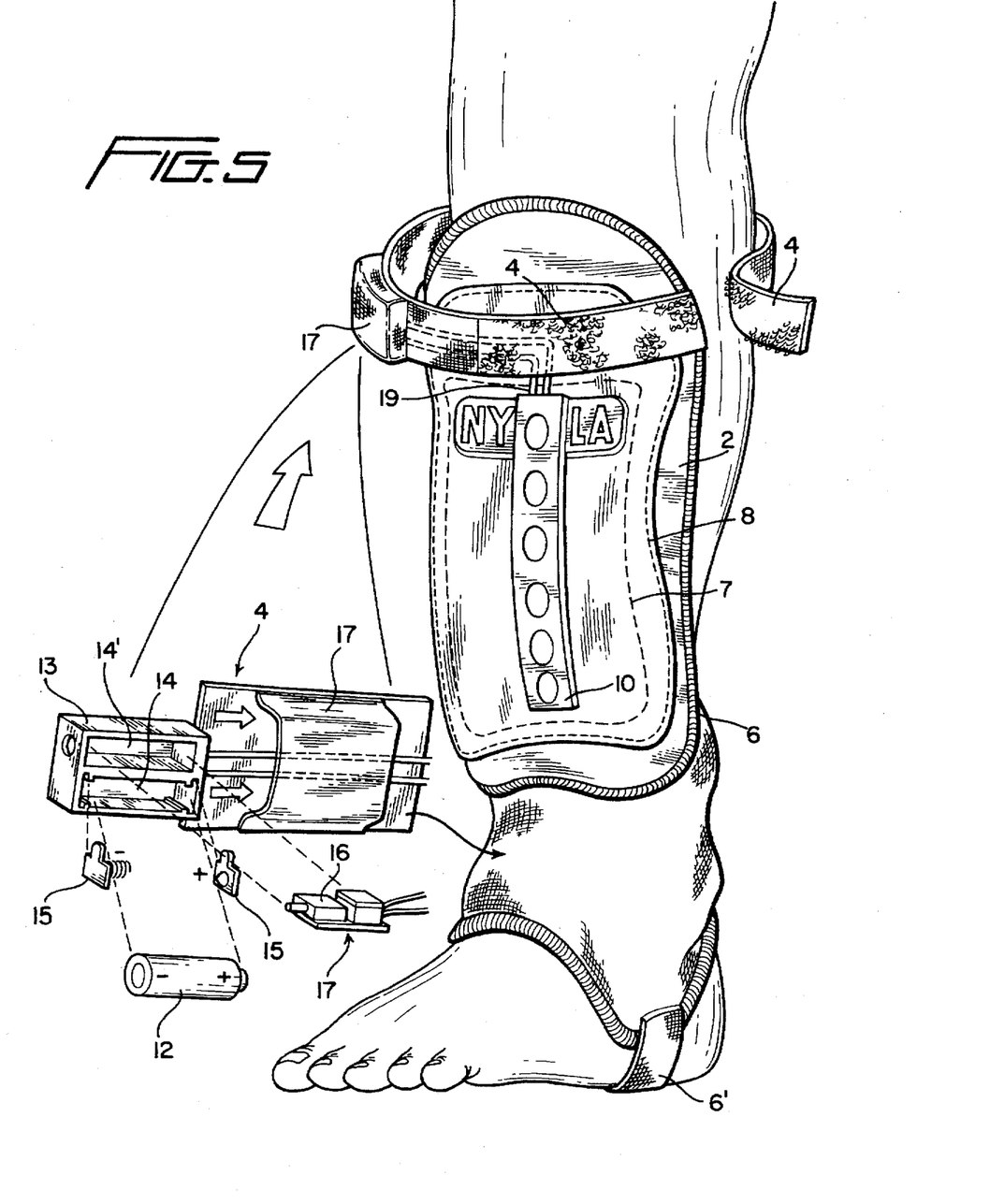
FIG. 5 is a perspective view showing further details of the calf protector of FIGS. 1 and 4.

FIGS. 1, 4, and 5 are perspective views of a calf protector constructed in accordance with the principles of a first preferred embodiment of the invention. The calf protector shown in FIGS. 1, 4, and 5 is made up of a layer of soft material or padding 1 enclosed between a backing layer or backpad 2, preferably made of a textile material, and a front plastic cover 3. The textile layer has attached thereto a strap 4 for attaching the protector to a calf 5. In addition, the calf protector may be provided with an elastic textile sock 6 having a foot strap 7 for further supporting the calf protector relative to the wearer's calf. The straps 4 and 7 may be in the form of textile bands, and may include VELCRO™ fasteners, buckles, or other known fastening means.

As is best illustrated in FIG. 4, the soft material padding 1 can be in the form of a silicon gel member, an "air cone" or air-filled sheet, a foam member, or any other known padding material suitable for use in a calf protector. The padding is stitched, in the illustrated embodiment, to the textile backpad along a stitching line 7, while the front plastic cover sheet is also stitched to the backpad along a stitching line 8, although those skilled in the art will appreciate that means other than stitching of attaching the padding 1 and the plastic cover 3 to the backpad 2 can also be used.

As illustrated in detail in FIG. 5, the calf protector of the preferred embodiment of the invention includes an EL strip 10 which is attached to the front cover by stitching, adhesive, double-sided tape, Velcro™, or any other suitable fastening means. The EL strip 10 is powered by batteries 12 situated in a power pack housing 13 including compartments 14 for the batteries 12 and standard battery terminal connecting devices 15. The power circuitry 16 is, in the illustrated embodiment, provided on a circuit board 17, the power pack being placed in an elastic pocket 18 formed in the fastening band 4, and the wires 19 preferably being enclosed within the band to emerge at the front of the calf protector and be preconnected to the EL strip attachment member.

Figure 3:
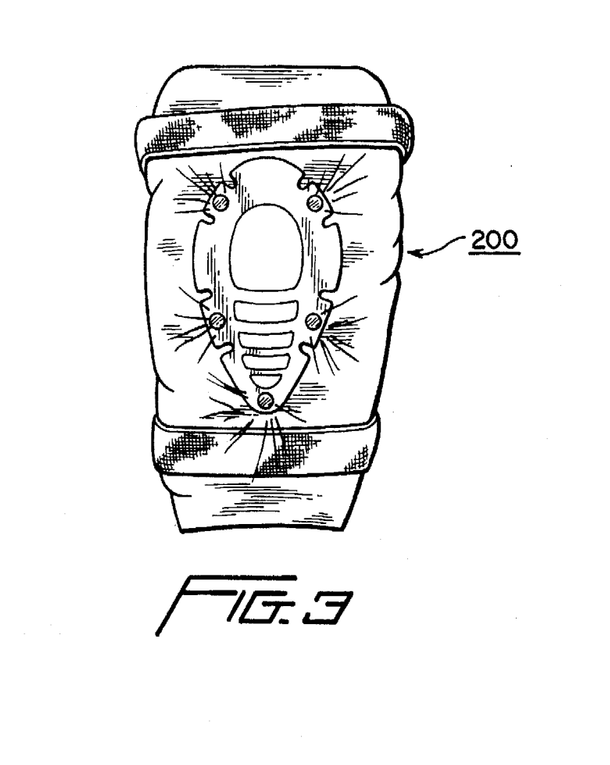
FIG. 3 is front view of an elbow protector constructed in accordance with the principles of the first preferred embodiment of the invention.

While only the details of the calf protector are shown in connection with this preferred embodiment of the invention, which is characterized by the inclusion of a plastic cover on the outside of the device, and the inclusion of the power pack within the strap which holds the protector on the wearer's calf, those skilled in the art will appreciate that the principles of the invention can be used in any protective device designed to protect the wearer of the device, including a knee protector as shown in FIG. 2, and an elbow protector as shown in FIG. 3.

As is apparent from the various EL strip designs shown in FIGS. 1–5, the use of an EL strip on a protective device offers not only increased visibility, but also numerous design possibilities. For example, the EL strip or strips provided on the preferred protective devices can be cut into different shapes, have different printing or designs included thereon, and provide different colors. In addition, it will be appreciated by those skilled in the art that the plastic cover of the protective device could be partially transparent or include cutouts and one or more EL strips could be placed inside the front cover adjacent the padding.

An alternative to the protective device of the first preferred embodiment of the invention is the protective device shown in FIGS. 6–11, involving placement of padding around various portions of a child's bicycle 20, in order to soften the impact of the child striking the metal portions of the bicycle 20. The protector devices may, for example, be placed around the handlebars 21 of the bicycle, in order to protect the rider's head, around the handlebar stem 22 to protect the rider's legs and knees, and around the mainframe 23 of the bicycle in order to protect the riders crotch, legs, feet, and ankles.

Figure 6:
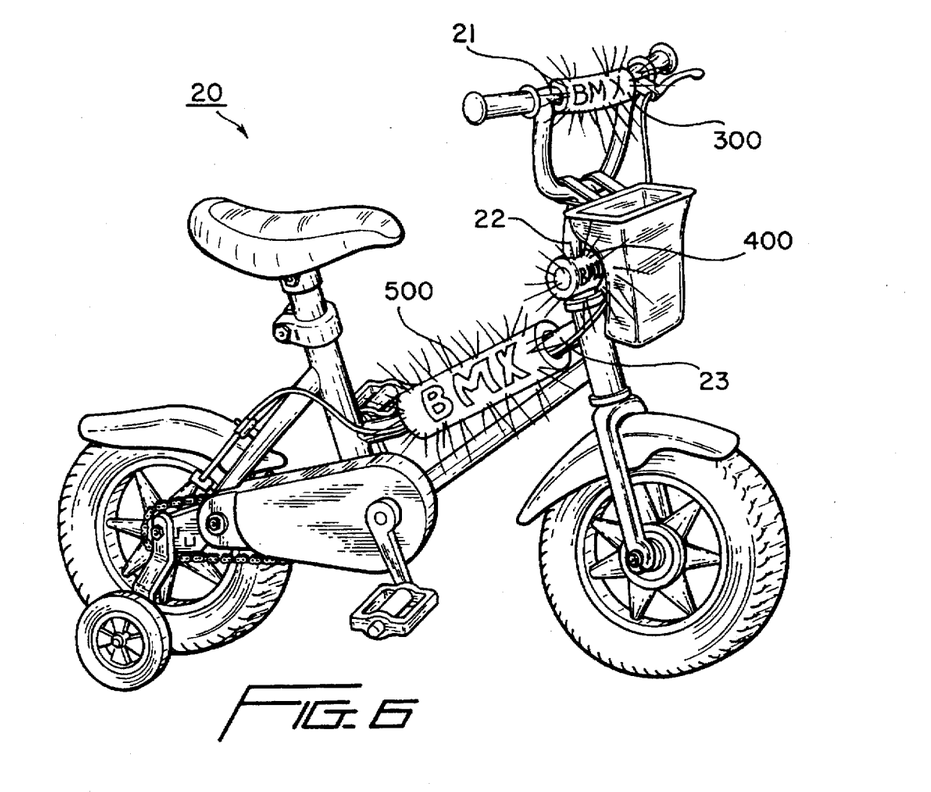
FIG. 6 is a perspective view of a child's bicycle which includes protective devices constructed in accordance with the principles of a second preferred embodiment of the invention.
Figure 7:
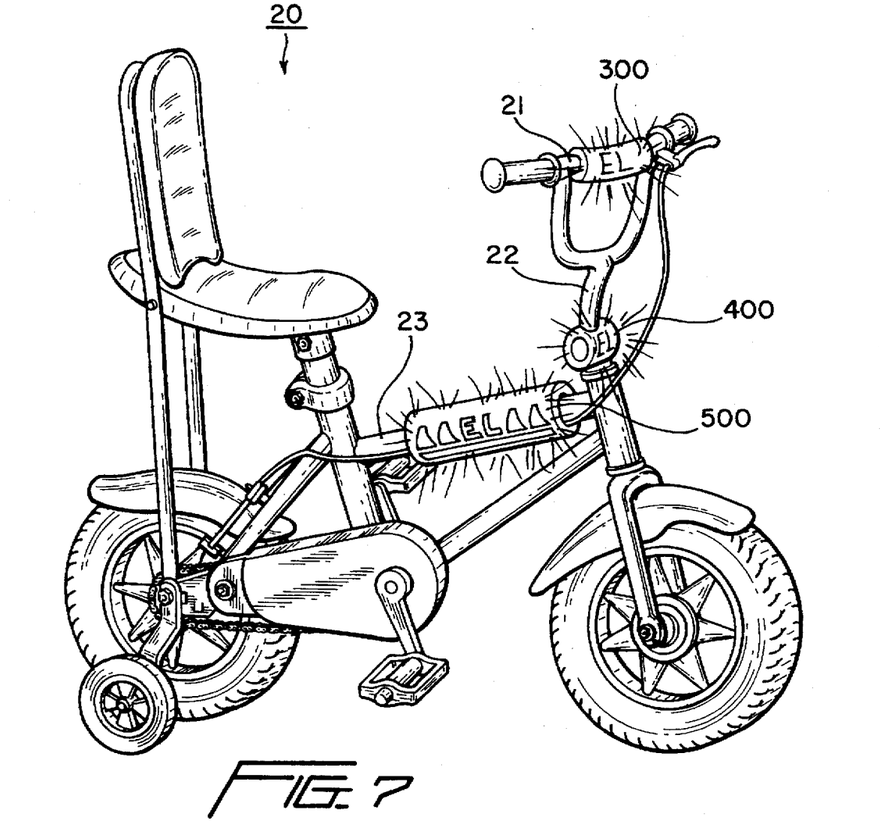
FIG. 7 is a perspective view of a child's bicycle which includes protective devices according to variations of the embodiment shown in FIG. 6.

FIG. 7 shows an arrangement similar to that of FIG. 6, except that the pattern provided by the lighting arrangement, has been changed from "BMX" to "E.L." in order to illustrate the improved design flexibility offered by EL strip design of the preferred embodiments.

Although the protective devices of this embodiment of the invention are illustrated as being in the form of padding for a child's bicycle 20, those skilled in the art will appreciate that the principles of this embodiment, in which the plastic front sheet has been omitted, may be extended to cover any padded protective devices in which the device is struck by the user during an impact in order to protect the user from striking the underlying support. For example, instead of child's bicycle 20, the protective devices of the invention could be used on a trail bike or scooter.

Figure 8:
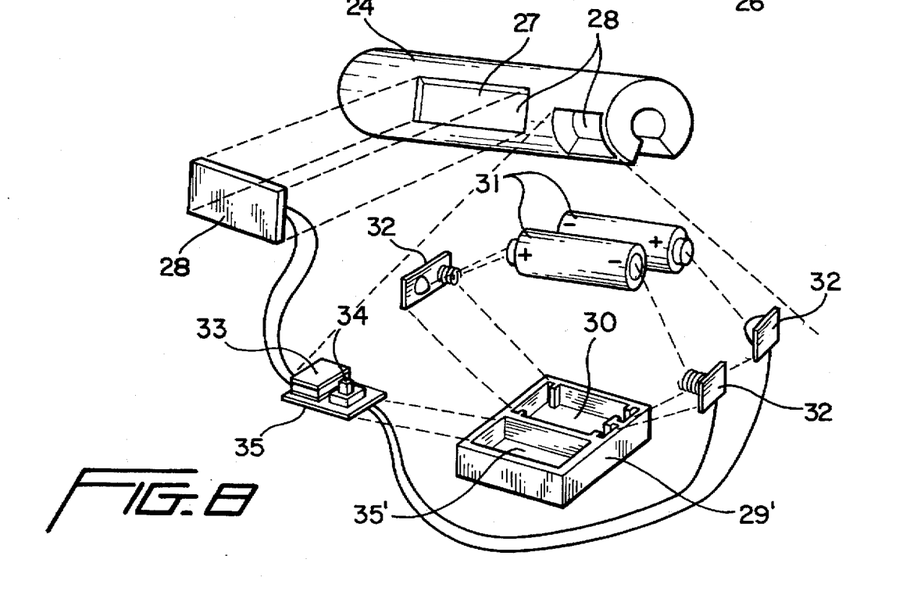
FIG. 8 is an exploded perspective view showing details of the protective devices shown in FIG. 6.
Figure 10:
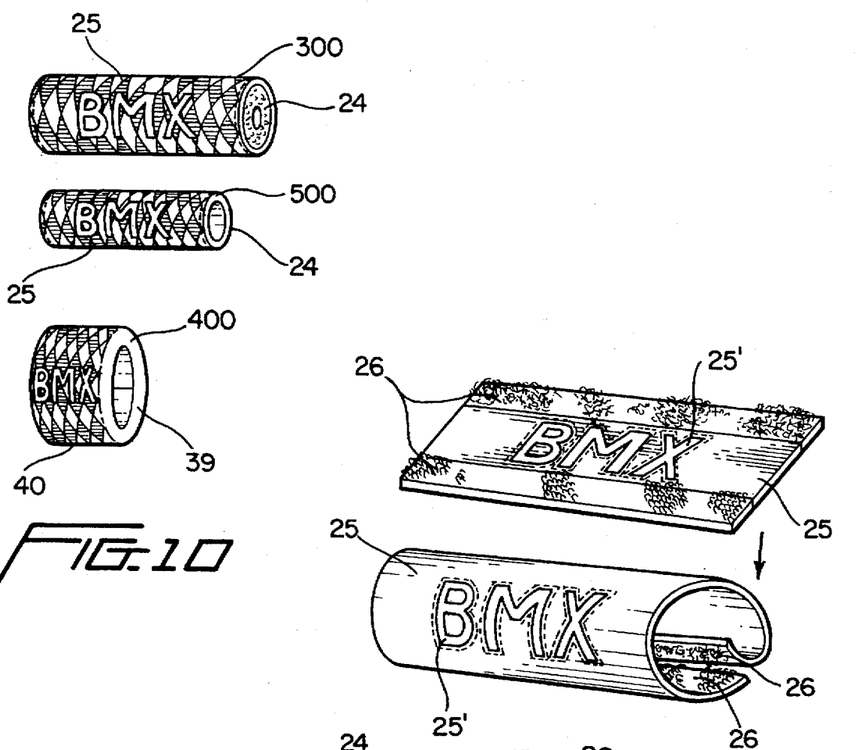
FIG. 10 shows further details of the protective devices illustrated in FIGS. 6–9.
Figure 11:
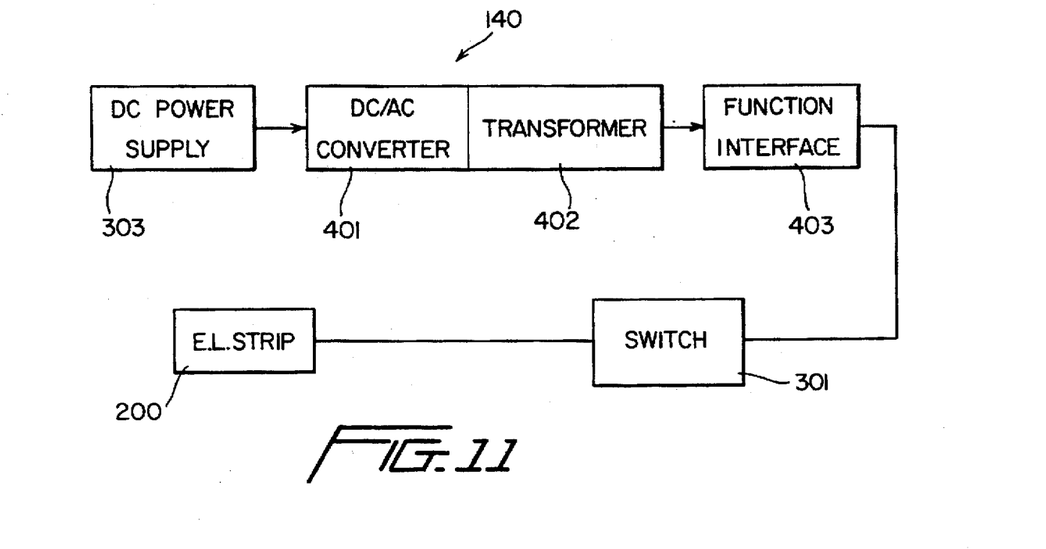
FIG. 11 shows still further details of the protective devices illustrated in FIGS. 6–9.

The construction of the handlebar or mainframe protective devices illustrated in FIGS. 6 and 7 is best understood in connection with the exploded perspective view of FIG. 8 and with the views of FIGS. 10 and 11. In this embodiment, the soft material or padding is in the form of a polyurethane foam cylinder 24 enclosed within a relatively soft transparent front cover sheet 25 having Velcro™ fasteners 26 attached directly to the padding for wrapping the padding around the bicycle frame member or handlebar and securing it thereto.

As illustrated, the foam cylinder 24 includes an indentation 27 shaped to accommodate an EL panel 28, and a further indentation 28 shaped to accommodate a power pack housing 29 which may be identical to the power pack housing 13 of the preferred embodiment of the invention, the power pack including battery compartments 30 for accommodating batteries 31 and connecting hardware 32, electric circuitry 33 and a switch 34 for switching the EL light on and off, and a circuit board 35 for mounting the circuitry and switch.

Figure 9:
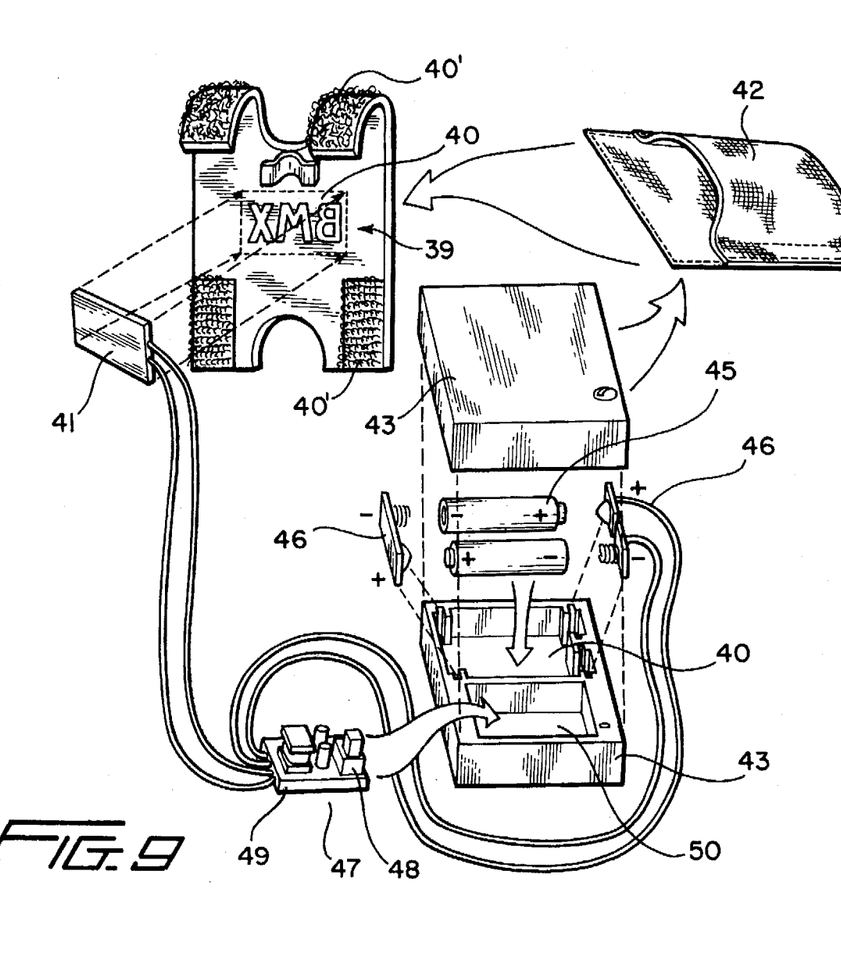
FIG. 9 is an exploded perspective view showing details of another of the protective devices shown in FIG. 6.

Details of the handlebar stem protector are shown in FIG. 9. As illustrated, the protector includes a soft material padding member 39 and a partially transparent or translucent front cover 40 sheet having affixed thereto an EL strip 41 and a pocket 42 for receiving the battery pack housing 43, which is identical to the power pack housing described above, including battery compartments 44 for housing batteries 45 and terminal connectors 46, circuitry 47 and a switch 48 mounted on a circuit board 49.

Figure 12:
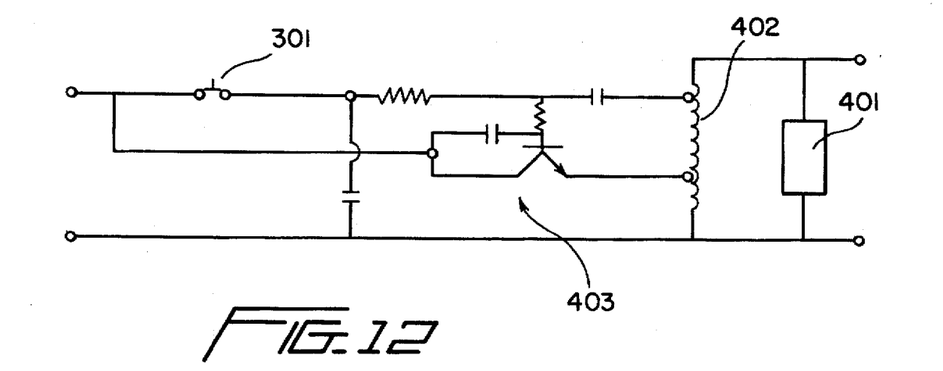
FIG. 12 is a schematic circuit diagram for the circuit board illustrated in FIGS. 5, 8, and 9.

Turning now details of the circuitry for causing the EL strip to light up, in the preferred embodiment shown in FIGS. 12 and 13, which can be used with any of the embodiments shown in FIGS. 1–11, power supplied by a DC power supply 303 is converted to AC power and, consequently, the DC power source 303 is electrically connected to the electro-luminescent light strip 200 via a circuit 400 including a DC/AC converter 401 electrically connected with a transformer 402, transformer 402 being further electrically connected with a function interface 403 and, via parallel connected switch 301, with the electro-luminescent strip 200.

In operation, the direct current supplied by DC power source 303 is thus converted into an alternating current of a desired frequency by DC/AC converter 401 to the transformer 402 for increasing the voltage of the alternating current, and then transmitted from the transformer 402 to the function interface 403. Function interface 403 provides a number of preset or switchable options for turning on the electro-luminescent light strip 200, e.g., steady, flash, sequential or random, and may take any desired form from a simple flasher circuit illustrated in FIG. 5 to a microprocessor, depending on the complexity of the special effects to be exhibited. Those skilled in the art will appreciate that the number of options is greatly increased if a multiple element strip such as the one disclosed in the above-mentioned U.S. patent application Ser. No. 08/305,294 is utilized. Also, while the electro-luminescent light strip can be turned on and off by means of a manual push button switch 301, it may also be desired to include or substitute a photosensitive, vibration-sensitive, tilt-sensitive, or motion-sensitive switch to automatically turn the light on and off upon the occurrence of external events such as nightfall or various movements by the wearer.

Having thus described a preferred embodiment of the invention and a number of different variations and modifications of the preferred embodiment, it is anticipated that still further variations and modifications will undoubtedly occur to those skilled in the art upon reading the above description, and it is therefore intended that the invention be interpreted, in accordance with the appended claims, to cover all such variations and modifications which fairly fall within the scope of the invention.

I claim:

1. A protective device, comprising:

a protective element consisting of a soft padding material positioned between a backpad and a plastic cover;

an electro-luminescent lighting element attached to the protective element and a power pack electrically connected to the electro-luminescent lighting element by wires;

means including a strap attached to the backpad for fastening the the protective element to a wearer of the protective device, wherein said strap has a pocket formed therein and wherein said power pack is housed within said pocket of said strap.

2. A protective device as claimed in claim 1, wherein said plastic cover is partially transparent to permit light from the electro-luminescent lighting element to shine through the cover.

3. A protective device as claimed in claim 1, wherein the protective device is a calf protector and the strap is a VELCRO™ band arranged to extend around the wearer's calf, and wherein the protective device further comprises a sock extending from said protective element said sock including a strap arranged to extend around the wearer's foot.

4. A protective device as claimed in claim 1, wherein the protective device is a kneepad and the backpad is a textile backpad.

5. A protective device as claimed in claim 1, wherein the protective device is an elbow pad and the backpad is a textile backpad.

* * * * *